United States Patent
Padala et al.

(10) Patent No.: US 12,205,455 B2
(45) Date of Patent: Jan. 21, 2025

(54) COGNITIVE FIREFIGHTING ASSISTANCE

(71) Applicant: International Business Machines Corporation, Armonk, NY (US)

(72) Inventors: Naga Srinivasa Reddy Padala, Vishakapatname (IN); Shikhar Kwatra, San Jose, CA (US); Shailendra Moyal, Pune (IN); Sarbajit K. Rakshit, Kolkata (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/355,968

(22) Filed: Jun. 23, 2021

(65) Prior Publication Data

US 2022/0415159 A1 Dec. 29, 2022

(51) Int. Cl.
G08B 25/00 (2006.01)
G08B 17/06 (2006.01)
G08B 27/00 (2006.01)

(52) U.S. Cl.
CPC ......... *G08B 25/006* (2013.01); *G08B 17/06* (2013.01); *G08B 27/001* (2013.01)

(58) Field of Classification Search
CPC ..... G08B 17/06; G08B 27/001; G08B 25/006
USPC .................................................... 455/404.01
See application file for complete search history.

(56) References Cited

U.S. PATENT DOCUMENTS

| | | | |
|---|---|---|---|
| 7,194,395 B2 | 3/2007 | Genovese | |
| 9,170,583 B2 | 10/2015 | Lozier | |
| 10,380,863 B2* | 8/2019 | Wedig | G08B 17/06 |
| 10,777,051 B1* | 9/2020 | Kumar | G05D 1/692 |
| 2012/0229283 A1* | 9/2012 | McKenna | G08B 29/183 340/584 |
| 2013/0066609 A1* | 3/2013 | Gilkes | G06F 16/29 703/6 |
| 2015/0339415 A1* | 11/2015 | Klein | G06F 30/20 703/6 |
| 2021/0065256 A1* | 3/2021 | Shontz | G06Q 30/0623 |
| 2021/0073449 A1* | 3/2021 | Segev | G06F 30/27 |

(Continued)

FOREIGN PATENT DOCUMENTS

| | | |
|---|---|---|
| CN | 103550892 B | 2/2014 |
| CN | 109331378 A | 2/2019 |
| KR | 102192028 B1 | 12/2020 |

OTHER PUBLICATIONS

Abdonmaleki, et al., "A Distributed Cooperative Reinforcement Learning Method for Decision Making in Fire Brigade Teams." Published Jan. 2013. 12 pages. RoboCup 2012, LNAI 7500, pp. 237-248. Published by ResearchGate. https://www.researchgate.net/publication/300155368_.

(Continued)

*Primary Examiner* — Maria El-Zoobi
(74) *Attorney, Agent, or Firm* — Anthony M. Pallone

(57) ABSTRACT

A processor may receive data regarding an emergency event. The processor may identify, using an artificial intelligence model, one or more features regarding the emergency event. The processor may determine that the one or more features are associated with one or more emergency response tasks. The processor may generate an action plan that incorporates the one or more emergency response tasks. The processor may output the action plan to a user.

17 Claims, 5 Drawing Sheets

(56) References Cited

U.S. PATENT DOCUMENTS

2022/0108622 A1* 4/2022 Derickson .............. G06N 3/006
2022/0377522 A1* 11/2022 Martin ................... H04W 4/12

OTHER PUBLICATIONS

Lawrence, "Reality check: creating a BIM digital twin." Published Oct. 2019. Printed Jan. 29, 2021. 12 pages. Published by CIBSE Journal. https://www.cibsejournal.com/general/reality-check-creating-a-bim-digital-twin/.

Loeffler, "Buildings with a digital twin have a lot to tell us." Printed Jan. 29, 2021. 5 pages. Published by Workplace Insight. https://workplaceinsight.net/buildings-with-a-digital-twin-have-a-lot-to-tell-us/.

McKinzie, "The Future of Artificial Intelligence in Firefighting." Published Oct. 25, 2018. Printed Jan. 29, 2021. 9 pages. Published by Fire Engineering. https://www.fireengineering.com/apparatus-equipment/artificial-intelligence-firefighting/#gref.

Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

COGNITIVE FIREFIGHTING ASSISTANCE

BACKGROUND

The present disclosure relates generally to the field of firefighting, and more specifically to cognitive generation of a firefighting action plan.

The causes of emergency events such as fires and how the emergency events develop vary. When a fire event occurs, many emergency response departments struggle to coordinate and plan how to resolve the emergency event as fire incidents and effective ways to resolve them vary.

SUMMARY

Embodiments of the present disclosure include a method, computer program product, and system for cognitive generation of an emergency response action plan.

A processor may receive data regarding an emergency event. The processor may identify, using an artificial intelligence model, one or more features regarding the emergency event. The processor may determine that the one or more features are associated with one or more emergency response tasks. The processor may generate an action plan that incorporates the one or more emergency response tasks. The processor may output the action plan to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
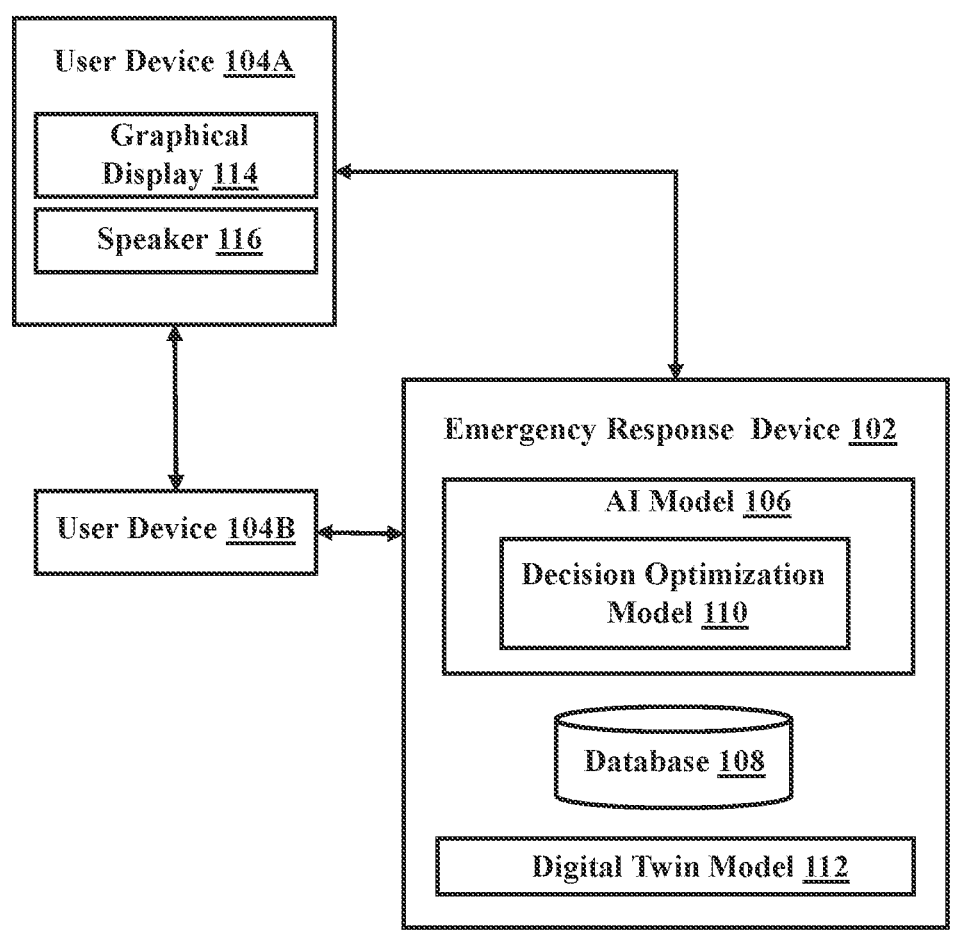
FIG. 1 is a block diagram of an exemplary system for cognitive generation of an emergency response action plan, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of emergency response, and more specifically to cognitive generation of an emergency response action plan. While the present disclosure is not necessarily limited to such applications, various aspects of the disclosure may be appreciated through a discussion of various examples using this context.

In some embodiments, a processor may receive data regarding an emergency event. In some embodiments, the data may be obtained from one or more sensors (e.g., internet-of-things sensors) that are configured to detect various factors regarding the emergency event (e.g., a fire). For example, the sensors may be fire detectors, image sensors, thermal sensors, infrared sensors, visual sensors, microphones, chemical sensors, photoelectric detectors, ionization detectors, optical flame detectors, or any combination thereof. In some embodiments, the sensors may be at the location of the emergency event or at a location on the periphery of the location of the emergency event. For example, the one or more sensors may be located in the same structure as the emergency event or another structure (e.g., the sensors may be oriented towards the structure of the emergency event or the second structure to confirm that fire has not spread to the second structure).

In some embodiments, the factors regarding the emergency event may include any conditions that indicate that a probable, potential, or actual fire is taking place (e.g., detection of smoke, detection of a fire, detection of a temperature increase). In some embodiments, the factors regarding the emergency event ay be visual detection of flames, smoke, or lack of visibility; detection of an increase in temperature; detection of a fire alarm alert, etc. In some embodiments, the factors regarding the emergency event may include any conditions that relates to how the fire is developing (e.g., detection of what is burning and what is proximate to the fire).

In some embodiments, the data regarding the fire may include data regarding conditions associated with the fire based on which the development (e.g., potential growth or decay) of the fire may vary or depend. In some embodiments, the data may include data regarding weather conditions at the scene of the fire. For example, external winds may affect a burning structure. The external winds may exaggerate the Stack effect by cooling the upper portion; of a structure. The external winds may create strong internal air tracks (air currents) if there are openings allowing the external winds to enter the structure. In some embodiments, the data may include data regarding the time of one or more incidents related to the fire and its development (e.g., the time that the fire was first detected, the time that the fire spread to particular locations or objects, the time that the temperature in the location of the fire exceeded/fell below a threshold, etc.).

In some embodiments, the data regarding the emergency event may include data regarding a location of the emergency event. In some embodiments, the data regarding the location may include information regarding the materials on fire (e.g., actually, probably, or potentially) or proximate to the fire (e.g., from a building construction plan). In some embodiments, the data regarding the location may include information regarding fire protection measures in the location (e.g., sprinkler systems, evacuation routes/plans for a building, use of fireproof or fire retardant materials that segregate fires to specific floors or rooms of the building, etc.). In some embodiments the data regarding the location may include information regarding location of special risks/ higher fire risk materials/conditions (e.g., the location of highly combustible materials, the location of hazardous materials, the location of a side wall that is close to a neighboring structure which may cause the fire to spread to the neighboring structure).

In some embodiments, the data regarding the emergency event may include data regarding emergency response resources. In some embodiments, the data regarding the emergency event may relate to the availability of emergency response resources. In some embodiments, the emergency response resources may include personnel, equipment, special teams (e.g., special search and rescue teams for certain scenarios), water, hoses, chemical fire retardants, etc. In some embodiments, the data regarding the emergency event may relate to where or how the emergency response resources may be obtained (e.g., certain resources may be obtained from neighboring emergency response departments and not the initial emergency response department that responded to the emergency event, or personnel that are responding to a different fire incident may be reassigned to respond to this fire incident).

In some embodiments, the processor may identify, using an artificial intelligence ("AI") model, one or more features regarding the emergency event. In some embodiments, the features regarding the emergency event may identify one or more objects (e.g., structures, furnishings, fixture, etc.) in or proximate to the fire, the materials that make up the objects, the nature of the burning of the object, the dimensions of the objects, the position of the objects, or any combination thereof. In some embodiments, the AI model may be trained to associate the objects in and proximate to the fire with information about how the objects may contribute to the development (e.g., increase, acceleration, diminishment, etc.) of the fire.

In some embodiments, the features regarding the emergency event may include features that relate to fire conditions. The fire conditions may describe the severity of the fire, the direction of the fire, the factors that are influencing the growth or diminishment of the fire, the position of the fire, the position of the fire with respect to other objects, etc. In some embodiments, the AI model may utilize object detection AI models (e.g., convolutional neural networks or you only look once models) to determine features or conditions related to the emergency event.

In some embodiments, identifying, using the AI model, the one or more features regarding the emergency event includes identifying that a first feature is above a heat threshold. For example, sensors located at the fire location may detect the temperature of various objects in a room. If the temperature of some objects are above a heat threshold, then the processor may determine that the objects are likely on fire.

In some embodiments, the processor may determine that the one or more features are associated with an emergency response task. In some embodiments, the emergency response tasks may relate to methods to resolve the emergency event (e.g., extinguishing the fire, searching for and rescuing trapped individuals, gathering supplies, etc.). In some embodiments, the methods may relate to techniques used to combat the fire. In some embodiments, the techniques that are used to combat the fire may include (but are not limited to): direct attack technique, indirect attack technique, combination attack technique, fog attack technique, indirect attack technique, attack technique involving two firefighting hoses/lines, or any combination thereof.

In some embodiments, the emergency response tasks may include steps to fight the fire that relate to the location of the emergency event. For example, the emergency response tasks may include search and rescue functions that take into account an evacuation route for a building or use of fire suppression techniques that segregate fires to certain locations. The emergency response tasks may include a prioritization of fire suppression tasks based on the known locations of hazards obtained from building plans. In some embodiments, the emergency response tasks may include approaches to fight the fire that relate to resources available to fight the fire. For example, the emergency response tasks may include instruction to obtain additional emergency response personnel or materials from other emergency response units.

In some embodiments, the artificial intelligence model may include a decision optimization model. In some embodiments, the decision optimization model may be used to generate the action plan that incorporates one or more emergency response tasks. In some embodiments, the decision optimization model may be used to optimize the selection of the one or more emergency response tasks from possible emergency response tasks. In some embodiments, the decision optimization model may be used to optimize the action plan given constraints that may affect the action plan. In some embodiments, the constraints may include constraints regarding time, resources (e.g., firefighting resources), hazards (e.g., there may be multiple emergency response strategies and some may protect against various hazards with varying effectiveness), priorities regarding emergency response, etc.

As an example, data from a particular fire incident may be captured, stored in a cloud database, and pushed along with other relevant information to emergency response units at the appropriate time. A plurality of sensors, sensors 1-20, may detect varying heat intensity levels at the location and send that data to the decision optimization model. The decision optimization model may incorporate/factor in the constraints and proceed to initiate the optimization step. The decision optimization model may take the partial derivative of the intensity (I) with respect to another constraint, number of firefighters available (F'), to form the objective function, f(F', I). The decision optimization model may iterate through the linear relationship to find the minimum function output via non-standardized back-propagation to achieve the min-max function.

In some embodiments, the data provided to the artificial intelligence model may include an output from a digital twin simulation of the emergency event. In some embodiments, a digital twin simulation of the emergency event may be created that predicts the future conditions of the emergency event. In some embodiments, the future conditions may relate to how the fire is predicted to increase or decrease at a later time. In some embodiments, the future conditions may include the trajectory a fire could take, new objects or hazards that may be consumed or at risk of burning from the fire, fire growth, temperature at the location, amounts of smoke, other characteristics of the fire, etc. In some embodiments, the output from the digital twin simulation may be provided to the AI model (e.g., by ensemble modeling) for the AI model to refine the action plan generated to account for the predictions made by the digital twin simulation.

In some embodiments, the digital twin simulation of the emergency event over time may be provided to the user. For example, a visual display of the digital twin simulation (e.g., showing how the fire is predicted to increase or decrease over time and in what ways) may be provided to firefighters that are on their way to the fire location. In some embodiments, the digital twin simulation may provide real-time visualizations to the firefighters about probable fire scenarios and their impact on other factors (e.g., search and rescue needs, fire spread to other structures, firefighting resources available). In some embodiments, the digital twin simulation may provide information related to the resources needed to prevent fire impact in different locations. In some embodiments, that information may be useful for resource planning or finding alternative: resources. In some embodiments, the digital twin simulation may provide information relating to high impact locations or scenarios that can lead to acceleration of the fire (e.g., location of combustible materials or changing wind patterns).

In some embodiments, the processor may generate an action plan that incorporates the one or more emergency response tasks. In some embodiments, the processor may output the action plan to a user. For example, the action plan may specify resources that are needed to combat the fire, techniques to use, tasks to be performed, a priority for the performance of tasks, tools that are to be used, other resources that need to be obtained (how many fire trucks from other fire companies, anal support, etc.), various emergency response functions that need to be performed (e.g., fire attack, search and rescue, ventilation, obtaining water supply, rapid intervention), etc. In some embodiments, the action plan may be provided to the user visually on a graphical display. In some embodiments, the action plan or components of the action plan may be provided to the user as an audio output.

In some embodiments, the processor may provide an automatic alert regarding the emergency event to the user. In some embodiments, the automatic alert may notify the user that an emergency event is potentially occurring. In some embodiments, the automatic alert may include the action plan. In some embodiments, the automatic alert may include any or all of the one or more emergency response tasks incorporated in the action plan. In some embodiments, the alert regarding the emergency event may be sent to individuals or systems other than the user. For example, the alert may be provided to nearby emergency response units to request additional resources (e.g., additional personnel or supplies) to assist in resolving the emergency event.

Referring now to FIG. 1, a block diagram of a system 100 for cognitive generation of an emergency response action plan is illustrated. System 100 includes an emergency response device 102 and user devices 104a and 104b. The emergency response device 102 and the user devices 104a and 104b are configured to be in communication with each other. In some embodiments, the emergency response device 102 and the user devices 104a and 104b may be any devices that contain a processor configured to perform one or more of the functions or steps described in this disclosure. Emergency response device 102 includes an AI model 106 and a database 108 for storing data associated with the AI model 106 including, but not limited to, data associated with the emergency event, the location of the emergency event, the emergency response resources for resolving the emergency event, and emergency response tasks (discussed above).

In some embodiments, a processor of the emergency response device 102 receives data regarding an emergency event. The emergency response device 102 identifies one or more features regarding the emergency event using the AI model 106. The emergency response device 102 determines that the one or more features are associated with one or more emergency response tasks using the AI model 106. The emergency response device 102 generates an action plan that incorporates the one or more emergency response tasks and outputs the action plan to user device 104a. In some embodiments, the AI model 106 may include a decision optimization model 110 to optimize the emergency response tasks in the action plan given constraints regarding emergency response resources, emergency response priorities, etc. In some embodiments, the AI model 106 may utilize data from a digital twin model 112 that is configured to simulate the progression of the emergency event over time. In some embodiments, the AI model 106 may utilize reinforcement learning to incorporate feedback regarding the one or more emergency response tasks and the outcome achieved by implanting the action plan, the one or more tasks, or components thereof.

In some embodiments, the emergency response device 102 may provide a digital twin simulation of the emergency event over time to the user device 104a. The digital twin simulation may illustrate the development of the emergency event over time on a visual display 114 of the user device 104a. In some embodiments, information regarding the action plan, components of the action plan, or one or more emergency response tasks may be provided to the user as an audio output using the speaker 116 of the user device 104a. In some embodiments, the emergency response device 102 may send an automatic alert regarding the emergency event to user device 104a. In some embodiments, the alert may automatically notify the user device 104a of the emergency event, the action plan, or any component of the action plan. In some embodiments, the emergency response device 102 may communicate with user device 104b regarding the emergency event, including regarding additional resources that may be needed to resolve the emergency event.

Figure 2:
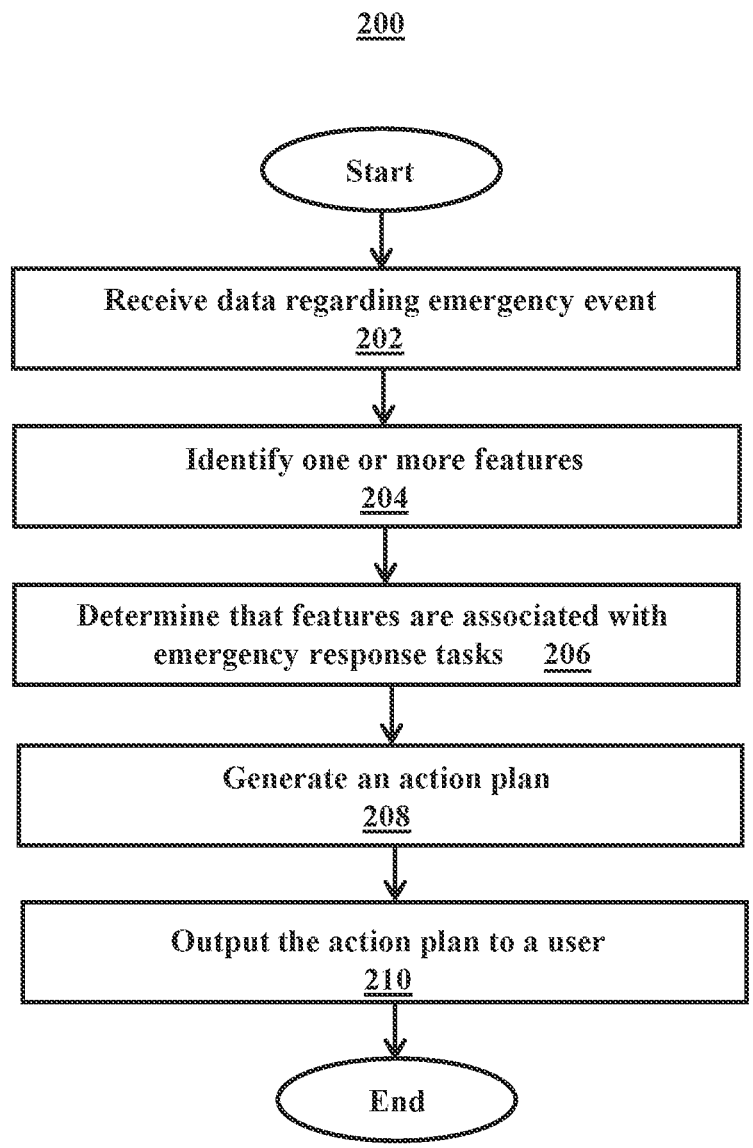
FIG. 2 is a flowchart of an exemplary method for cognitive generation of an emergency response action plan, in accordance with aspects of the present disclosure.

Referring now to FIG. 2, illustrated is a flowchart of an exemplary method 200 for cognitive generation of an emergency response action plan, in accordance with embodiments of the present disclosure. In some embodiments, a processor of a system may perform the operations of the method 200. In some embodiments, method 200 begins at operation 202. At operation 202, the processor receives data regarding an emergency event. In some embodiments, method 200 proceeds to operation 204, where the processor identifies, using an artificial intelligence model, one or more features regarding the emergency event. In some embodiments, method 200 proceeds to operation 206. At operation 206, the processor determines that the one or more features are associated with one or more emergency response tasks. In some embodiments, method 200 proceeds to operation 208. At operation 208, the processor generates an action plan that incorporates the one or more emergency response tasks. In some embodiments, method 200 proceeds to operation 210. At operation 210, the processor outputs the action plan to a user.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
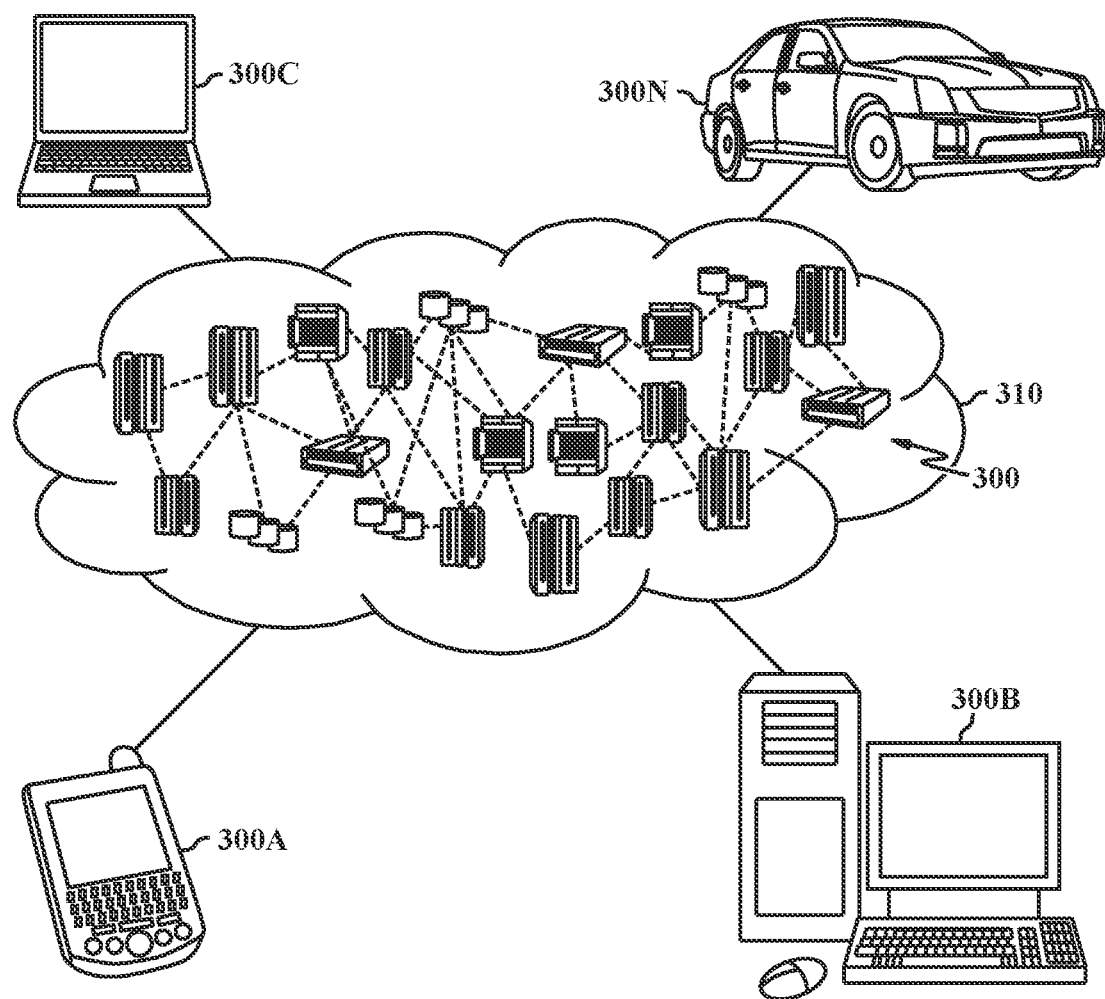
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
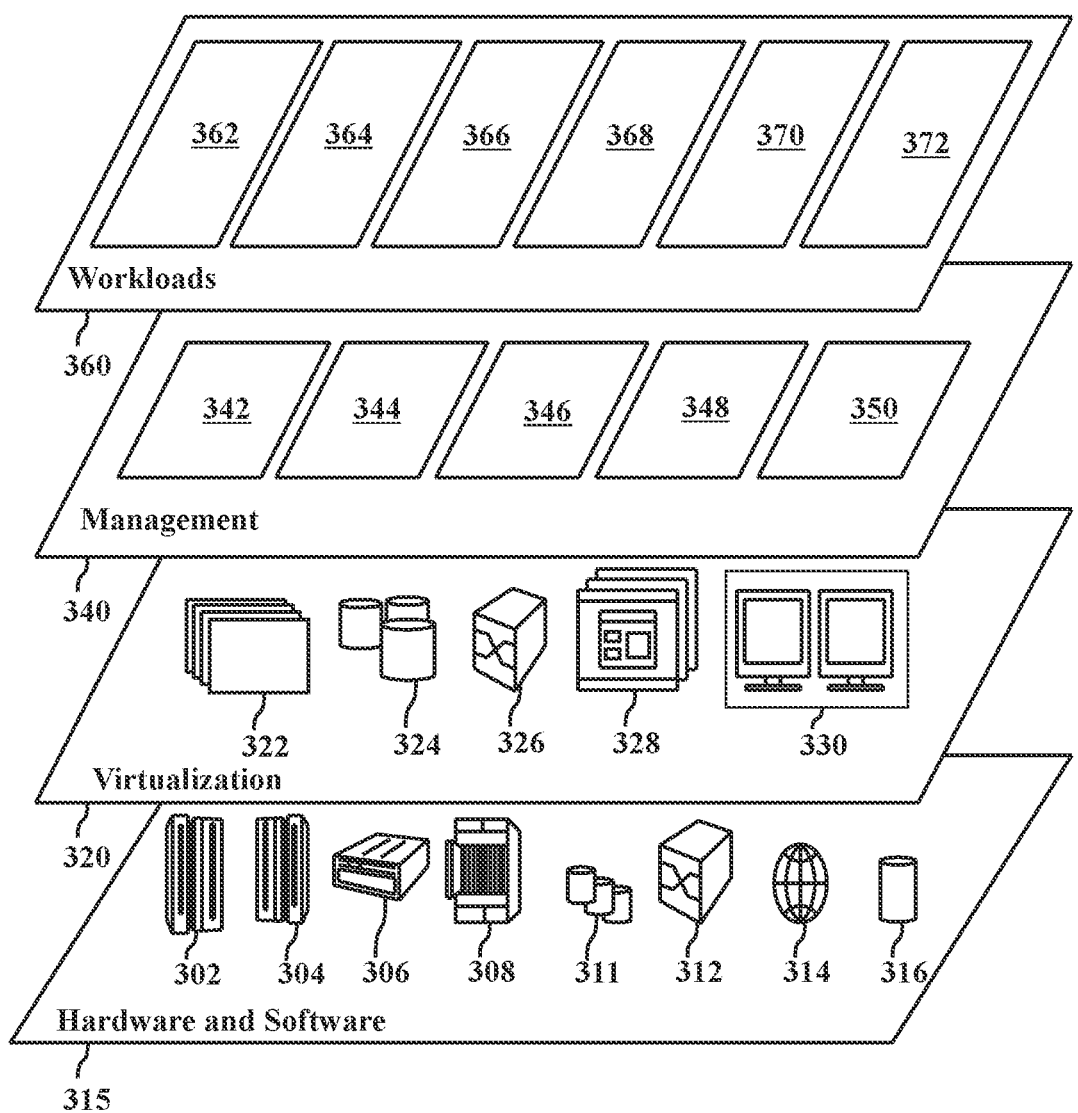
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and cognitive generation of an emergency response action plan 372.

Figure 4:
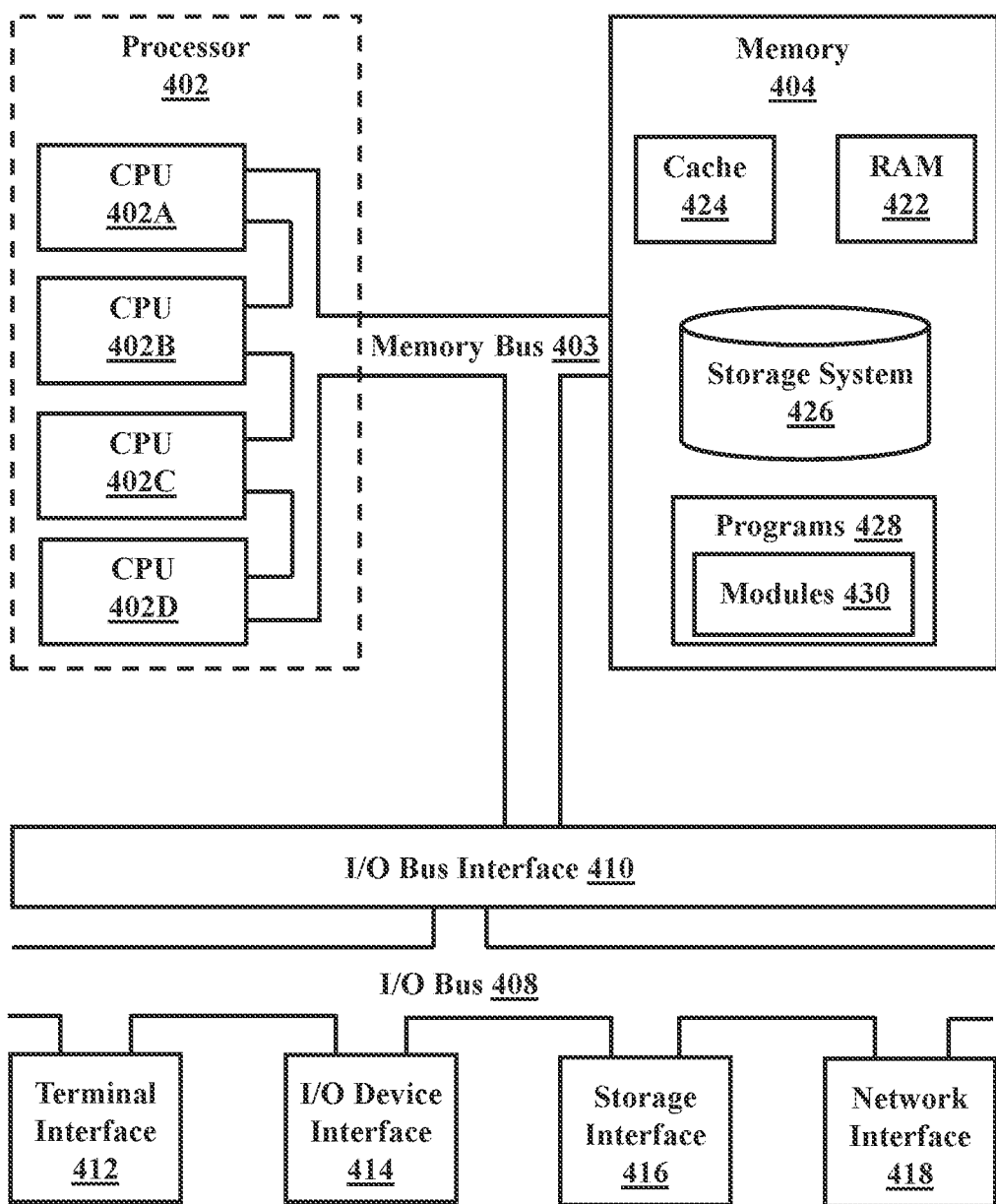
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
receiving, by a processor, data regarding an emergency event, wherein the emergency event comprises a fire, wherein the data comprises a location of the emergency event, and wherein the location comprises a building, and wherein the data comprises external wind conditions affecting the building;
identifying, using an artificial intelligence (AI) model, one or more features regarding the emergency event based on the data, wherein the one or more features comprise one or more objects which are proximate to the fire, and wherein the one or more objects are identified by the AI model using a convolutional neural network object detection model;
determining that the one or more features are associated with one or more emergency response tasks, wherein the one or more emergency response tasks comprise a prioritization of fire suppression tasks to be performed based on known locations of hazards obtained from a building plan of the building;
generating, by a decision optimization model, an action plan that incorporates the one or more emergency response tasks, with the action plan including information indicative of a set of heat intensity levels received from a set of Internet of Things (IoT) sensors;
responsive to the generation of the action plan, optimizing, by the decision optimization model, selection of emergency response tasks within the action plan based, at least in part, upon the set of heat intensity levels received from the set of IoT sensors; and
outputting the optimized action plan to a user, wherein the outputting comprises providing the fire suppression tasks to the user as audio output.

2. The method of claim 1, wherein identifying, using the AI model, the one or more features regarding the emergency event includes identifying a first feature is above a heat threshold.

3. The method of claim 1, wherein the data regarding the emergency event includes data regarding emergency response resources.

4. The method of claim 1, wherein the artificial intelligence model includes a decision optimization model.

5. The method of claim 1, wherein the data provided to the artificial intelligence model includes an output from a digital twin simulation of the emergency event.

6. The method of claim 1, further comprising:
providing a digital twin simulation of the emergency event over time to the user.

7. The method of claim 1, further comprising:
providing an automatic alert regarding the emergency event to the user.

8. A system comprising:
a memory; and
a processor in communication with the memory, the processor being configured to perform operations comprising:
receiving data regarding an emergency event, wherein the emergency event comprises a fire, wherein the data comprises a location of the emergency event, and wherein the location comprises a building, and wherein the data comprises external wind conditions affecting the building;
identifying, using an artificial intelligence (AI) model, one or more features regarding the emergency event based on the data, wherein the one or more features comprise one or more objects which are proximate to the fire, and wherein the one or more objects are identified by the AI model using a convolutional neural network object detection model;
determining that the one or more features are associated with one or more emergency response tasks, wherein the one or more emergency response tasks comprise a prioritization of fire suppression tasks to be performed based on known locations of hazards obtained from a building plan of the building;
generating, by a decision optimization model, an action plan that incorporates the one or more emergency response tasks, with the action plan including information indicative of a set of heat intensity levels received from a set of Internet of Things (IoT) sensors;
responsive to the generation of the action plan, optimizing, by the decision optimization model, the selection of emergency response tasks within the action plan based, at least in part, upon the set of heat intensity levels received from the set of IoT sensors; and
outputting the optimized action plan to a user, wherein the outputting comprises providing the fire suppression tasks to the user as audio output.

9. The system of claim 8, wherein identifying, using the AI model, the one or more features regarding the emergency event includes identifying a first feature is above a heat threshold.

10. The system of claim 8, wherein the data regarding the emergency event includes data regarding emergency response resources.

11. The system of claim 8, wherein the artificial intelligence model includes a decision optimization model.

12. The system of claim 8, wherein the data provided to the artificial intelligence model includes an output from a digital twin simulation of the emergency event.

13. The system of claim 8, the operations further comprising: providing a digital twin simulation of the emergency event over time to the user.

14. The system of claim 8, the operations further comprising: providing an automatic alert regarding the emergency event to the user.

15. A computer program product comprising:
a computer readable storage medium having program instructions embodied therewith, the program instructions executable by a processor to cause the processor to perform operations, the operations comprising:
receiving data regarding an emergency event, wherein the emergency event comprises a fire, wherein the data comprises a location of the emergency event, and wherein the location comprises a building, and wherein the data comprises external wind conditions affecting the building;
identifying, using an artificial intelligence (AI) model, one or more features regarding the emergency event based on the data, wherein the one or more features comprise one or more objects which are proximate to the fire, and wherein the one or more objects are identified by the AI model using a convolutional neural network object detection model;
determining that the one or more features are associated with one or more emergency response tasks, wherein the one or more emergency response tasks comprise a prioritization of fire suppression tasks to be performed based on known locations of hazards obtained from a building plan of the building;

generating, by a decision optimization model, an action plan that incorporates the one or more emergency response tasks, with the action plan including information indicative of a set of heat intensity levels received from a set of Internet of Things (IoT) sensors;

responsive to the generation of the action plan, optimizing, by the decision optimization model, the selection of emergency response tasks within the action plan based, at least in part, upon the set of heat intensity levels received from the set of IoT sensors; and outputting the optimized action plan to a user, wherein the outputting comprises providing the fire suppression tasks to the user as audio output.

16. The computer program product of claim 15, wherein the data regarding the emergency event includes data regarding emergency response resources.

17. The computer program product of claim 15, wherein the artificial intelligence model includes a decision optimization model.

* * * * *